United States Patent
Goodwyn

(10) Patent No.: US 10,523,741 B2
(45) Date of Patent: Dec. 31, 2019

(54) SYSTEM AND METHOD FOR AVOIDING PROXY CONNECTION LATENCY

(71) Applicant: SOFTNAS, LLC, Houston, TX (US)

(72) Inventor: Benjamin Goodwyn, Cypress, TX (US)

(73) Assignee: SOFTNAS, LLC, Houston, TX (US)

( * ) Notice: Subject to any disclaimer, the term of this patent is extended or adjusted under 35 U.S.C. 154(b) by 406 days.

(21) Appl. No.: 15/249,114

(22) Filed: Aug. 26, 2016

(65) Prior Publication Data

US 2017/0063972 A1 Mar. 2, 2017

Related U.S. Application Data

(60) Provisional application No. 62/211,424, filed on Aug. 28, 2015.

(51) Int. Cl.
  *G06F 15/16* (2006.01)
  *H04L 29/08* (2006.01)
  *H04L 12/24* (2006.01)

(52) U.S. Cl.
  CPC ............ *H04L 67/10* (2013.01); *H04L 41/083* (2013.01); *H04L 67/14* (2013.01); *H04L 67/141* (2013.01); *H04L 67/28* (2013.01)

(58) Field of Classification Search
  CPC ..... H04L 67/10; H04L 41/083; H04L 67/174; H04L 67/141; H04L 67/28; H04L 41/12; H04L 5/0055
  See application file for complete search history.

(56) References Cited

U.S. PATENT DOCUMENTS

| | | | | |
|---|---|---|---|---|
| 7,117,526 B1* | 10/2006 | Short | ................ | G06Q 20/3674 726/5 |
| 7,373,660 B1* | 5/2008 | Guichard | ................ | H04L 47/10 726/15 |
| 8,606,875 B1* | 12/2013 | Chouanard | ........... | H04L 9/3268 709/217 |
| 8,776,209 B1* | 7/2014 | Kumar | ................ | H04L 63/0272 380/270 |
| 2006/0215578 A1* | 9/2006 | Andrapalliyal | ..... | H04L 12/4679 370/254 |
| 2007/0126623 A1* | 6/2007 | Workman | ............. | G01S 13/878 342/126 |
| 2007/0195791 A1* | 8/2007 | Bosch | ................... | H04W 8/082 370/395.52 |
| 2008/0178266 A1* | 7/2008 | Touray | ................ | H04L 63/0884 726/4 |

(Continued)

*Primary Examiner* — Benjamin M Thieu
(74) *Attorney, Agent, or Firm* — Polsinelli PC

(57) ABSTRACT

Proxy server can have an existing connection to a remote server and does not need to wait for initial connection acknowledgement before notifying the client. When the client requests to use a remote service, the proxy server will acknowledge the request immediately to the client so that the initial request and associated data to be sent to the remote server is ready to be transmitted. The proxy server can assign a sub-channel identifier not currently in use and transmit a combination of instructions in a single data packet that indicates what service should be connected to on the remote proxy server and the initial data to transmit to the remote server. In this manner the round trip is avoided in establishing the initial connection to the remote server vastly reducing the amount of time before the client receives a response from the remote server.

17 Claims, 3 Drawing Sheets

(56) References Cited

U.S. PATENT DOCUMENTS

| | | | |
|---|---|---|---|
| 2009/0293066 A1* | 11/2009 | Low | G06F 9/543 |
| | | | 719/316 |
| 2011/0093610 A1* | 4/2011 | Rezaiifar | H04L 67/02 |
| | | | 709/232 |
| 2013/0019283 A1* | 1/2013 | Rice | H04L 63/20 |
| | | | 726/4 |
| 2014/0269564 A1* | 9/2014 | Tie | H04W 76/12 |
| | | | 370/329 |
| 2014/0317276 A1* | 10/2014 | Tie | H04L 45/306 |
| | | | 709/224 |
| 2015/0134956 A1* | 5/2015 | Stachura | H04L 63/0807 |
| | | | 713/168 |
| 2015/0193404 A1* | 7/2015 | Danziger | G06F 17/2288 |
| | | | 715/229 |
| 2016/0219060 A1* | 7/2016 | Karunakaran | G06F 21/33 |
| 2016/0241633 A1* | 8/2016 | Overby, Jr. | H04L 63/20 |
| 2016/0292694 A1* | 10/2016 | Goldschlag | H04L 63/20 |

\* cited by examiner

SYSTEM AND METHOD FOR AVOIDING PROXY CONNECTION LATENCY

CROSS-REFERENCE TO RELATED APPLICATION

The application claims benefit to U.S. provisional application Ser. No. 62/211,424 filed Aug. 28, 2015 entitled "System and Method for Avoiding Proxy Connection Latency," which is hereby incorporated by reference in its entirety.

TECHNICAL FIELD

The present disclosure generally relates to proxy connection protocols, specifically, a system and method for avoiding proxy connection latencies.

BACKGROUND

A proxy server is a hardware or software services that acts as an intermediary between a client and one or more remote servers. The client connects to the one or more remote servers through the proxy server using a series of blocks including: (i) the client requests connection to the proxy server, (ii) the client waits for acknowledgment of the service connection, (iii) the client transmits a connect request, to the proxy server, indicating a remote server to be accessed, (iv) the client waits for acknowledgment of a connection to the remote server, and (v) transmits the request to be sent to the remote server. The establishment of an initial connection between the client and the remote server can be a time consuming process.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
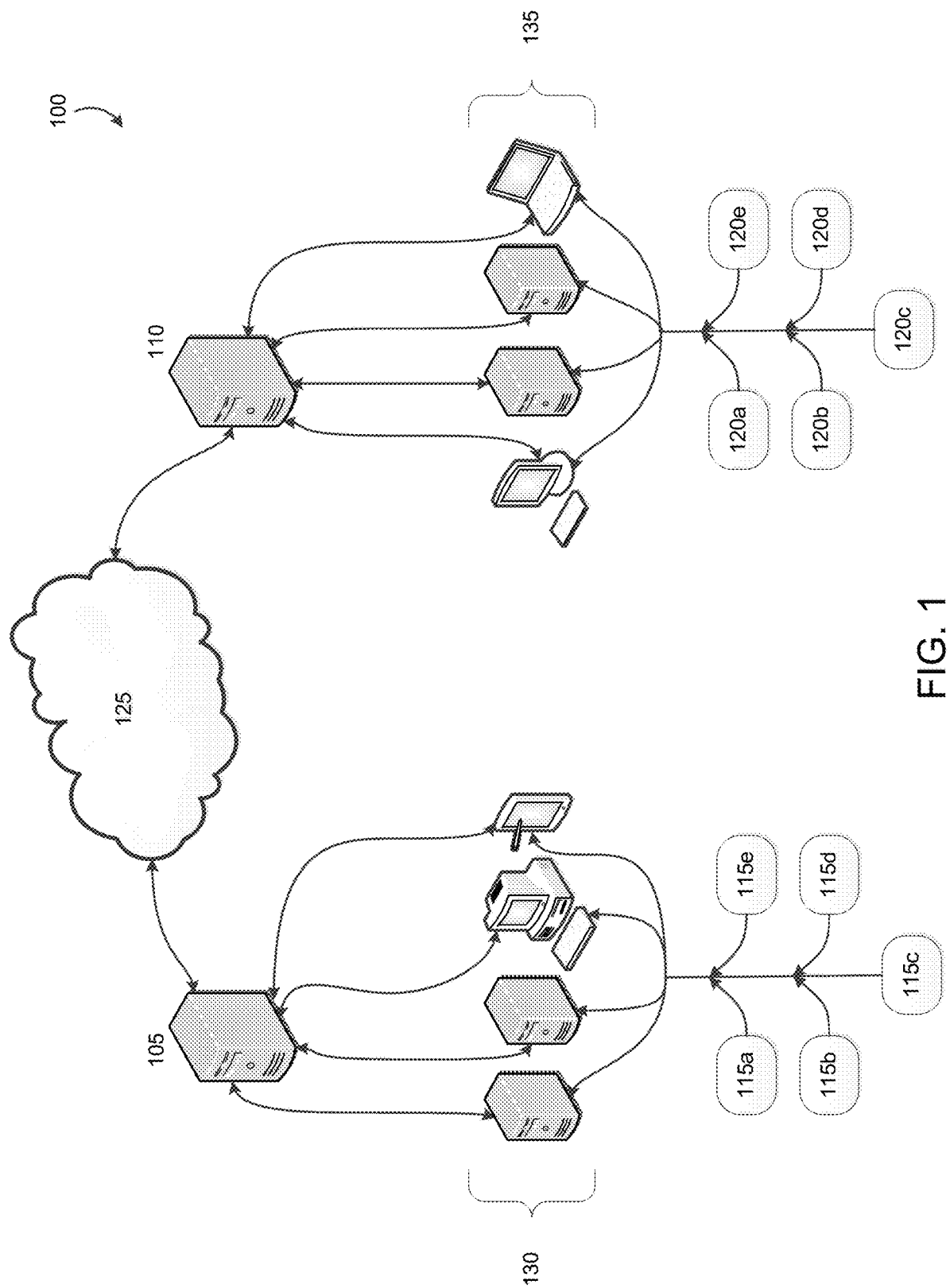
FIG. 1 illustrates a block diagram of a system for avoiding proxy connection latency, in accordance with an example embodiment of the present technology.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Use of "indicia" may indicate either or both of the singular usage of the term, "indicium," or the plural form "indicia," or vice versa. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, blocks, operations, elements, and/or components, but do not preclude the presence or addition of one or more other features, integers, blocks, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected "may be construed to mean "upon determining" or "in response to determining" or "upon detecting [the stated condition or event]" or "in response to detecting [the stated condition or event]," depending on the context.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The above deficiencies and other latency problems associated with proxy servers are reduced or eliminated by utilizing long-standing connections between a proxy server and remote server. Specifically, by utilizing a protocol where the proxy server assigns and manages the sub-channels within a long-standing tunnel connection independent of the remote server.

The proxy server can already have an existing connection to the remote server and does not need to wait for initial connection acknowledgement before notifying the client. When the client requests to use a remote service, the proxy server will acknowledge the request immediately to the client so that the initial request and associated data to be sent to the remote server is ready to be transmitted. The proxy server will assign a sub-channel identifier not currently in use and transmit a combination of instructions in a single data packet that indicates what service should be connected to on the remote proxy server and the initial data to transmit to the remote server. In this manner the round trip is avoided in establishing the initial connection to the remote server and the round trip is avoided in waiting for a remote server connection acknowledgement vastly reducing the amount of time before the client receives a response from the remote server.

In some embodiments, a proxy server is communicatively coupled to at least one remote server by a network and having access a remote service, the proxy server and the remote server communicating over the network by a long-standing tunnel. The proxy server is configured to perform (in response to receiving a connection request from a local service of a client to connect with the remote service of the remote server) the following: transmit, to the local service of the client, an acknowledgment the connection was successful, when the proxy server has not yet received the acknowledgment from the remote server; receive, from the local service of the client, data to transmit to the remote server; assigning an unused sub-channel over the long-standing tunnel to the connection requested from the local service; and transmitting to the remote server the data from the local service of the client to the remote service on the remote server. While, the configuration of the proxy server above is illustrated in a particular order, those of ordinary skill in the art will appreciate the order illustrated above can be executed in any order that accomplished the technical advantages of the present disclosure and can include fewer or more operations than illustrated.

FIG. 1 is a block diagram illustrating a system 100 for avoiding proxy connection latency, in accordance with an example embodiment. For illustration purposes, clients, servers, and services are described as local or remote. However, the local and remote labels can be reversed or alternated in some embodiments. System 100 can include one or more local clients 130 (e.g., computer systems, servers, etc.) connected to a proxy server 105 (e.g., on-ramp, client-side stub, etc.). Clients 130 can execute local services 115a-e (e.g., replicate source, CIFS/SMB client, cloud storage, NFS client, and iSCSI initiator). System 100 can also include one or more remote clients 135 (e.g., computer systems, servers, etc.) connected to a remote server 110 (e.g., off-ramp, server-side stub, etc.). Remote clients 130 can execute remote services 120a-e (e.g., replicate target, CIFS/SMB server, cloud storage, NFS server, and iSCSI target). In some embodiments, remote server 110 can execute remote services 120a-e. Proxy server 105 can be communicatively connected to remote server 110 by a communication network 125 (e.g., the Internet, local area network, wide area network, virtual private network, etc.). In some examples, proxy server 105 and remote server 110 can communicate using user datagram protocol (UDP). In some examples, proxy server 105 and remote server 110 can communicate using Transmission Control Protocol (TCP).

In some embodiments, a long-standing tunnel can be configured between proxy server 105 and remote server 110. Tunneling is a technique that enables remote access users to connect to a variety of network resources through a public data network (e.g., the Internet, local area network, wide area network, virtual private network, etc). For example, proxy server 105 and remote server 110 can form a symmetric relationship. Remote server 110 can publish services (e.g., 120a-e) that are available to the proxy server 105 (i.e., when properly authenticated). The publishing of available services can enable automated discovery of the network topology and the ability to dynamically remap services to other remote services. Once established, the connection (e.g., tunnel) can be used bi-directionally (e.g., when both ends are off-ramps only a single, multiplexed connection is needed). Proxy server 105 (e.g., on-ramp) can connect to the remote server 110 (e.g., off-ramp) by a secure connection (e.g., secure shell, public-private key cryptography, etc.). Once the connection has been established, proxy server 105 can remember which remote servers they have previously connected to and can attempt to keep the established connection (e.g., tunnel) open with remote server 110. In some examples, proxy server 105 can be configured to connect to multiple remote servers.

Figure 2:
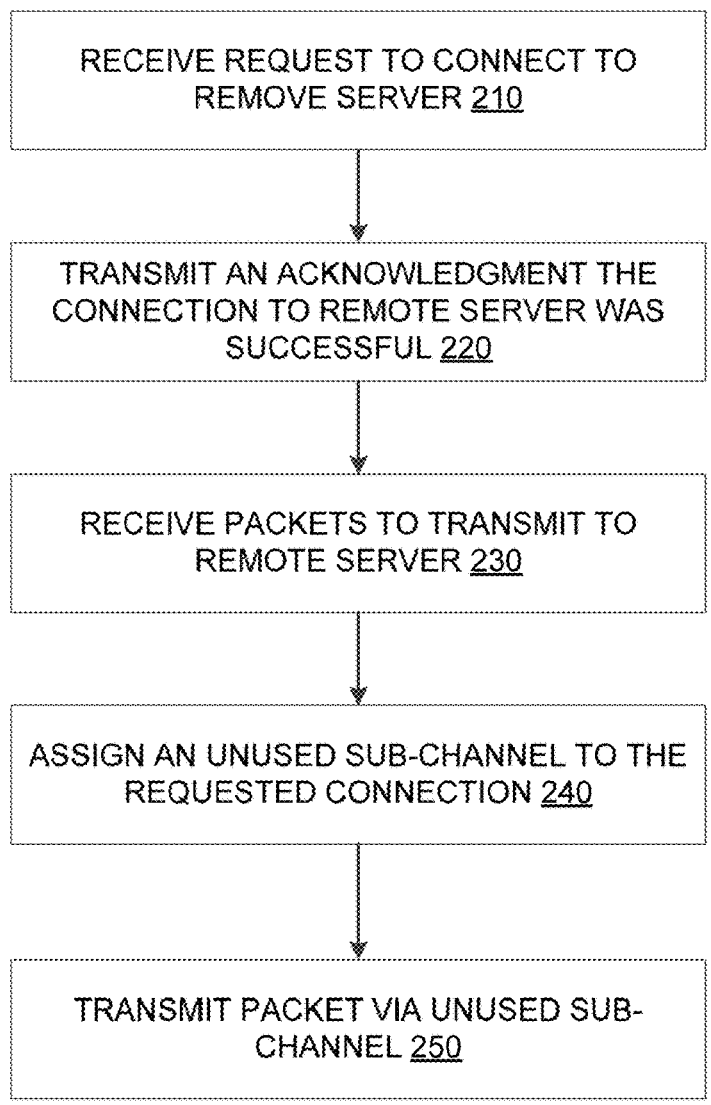
FIG. 2 illustrates a flow diagram of a method for avoiding proxy connection latency, in accordance with an example embodiment of the present technology.

FIG. 2 illustrates a flow diagram of a method for avoiding proxy connection latency, in accordance with an example embodiment of the present technology. The method of FIG. 2 is provided by way of example, as there are a variety of ways to carry out the method. Additionally, while the example of method 200 is illustrated with a particular order, those of ordinary skill in the art will appreciate the FIG. 2 and the blocks illustrated therein can be executed in any order that accomplished the technical advantages of the present disclosure and can include fewer or more blocks than illustrated.

Each block shown in FIG. 2 can represent one or more processes, methods, or subroutines, carried out in example method 200. The method illustrated in FIG. 2 can be implemented in the system 100 illustrated in FIG. 1. Each block in FIG. 2 can be carried out by a proxy server 105, local clients 130, local services 115a-e, remote server 110, or remote services 120a-e illustrated in FIG. 1. Additionally, those of ordinary skill in the art will appreciate that the blocks illustrated in FIG. 2 can included instructions of processes stored in a non-transitory computer readable medium communicatively coupled to a proxy server 105, local clients 130, local services 115a-e, remote server 110, or remote services 120a-e. For purposes of illustration, FIG. 2 will be described from the perspective of the proxy server 105.

At block 210, proxy server 105 can receive a connection request from a local client 130 to a remote server 110. In some embodiments, a local service 115a-e running on a local client 130 can request a connection to a remote server running a remote service. For example, a network file system (NFS) client service (e.g., NFS daemon, UNIX mount command, etc.) can request access to a remote file system (e.g., NFS server) on the remote server 110 through proxy server 105.

At block 220, proxy server 105 can transmit an acknowledgment to the local service running on the local client 130 that a connection with the remote server 110 was successful. In some embodiments, the acknowledgment is transmitted before the proxy server 105 has physically received acknowledgment that the connection was successful. In this manner, a round trip is avoided in establishing an initial connection. For example, the acknowledgment can be transmitted in the manner described above when there a currently active tunnel connection (e.g., a long-standing tunnel, etc.) exists between the proxy server 105 and remote server 110. The proxy server 105 does not have to wait to transmit an acknowledgement that the connection was successful because an active connection between the proxy server 105 and remote server 110 exists. In some embodiments, the acknowledgment to a local service request can be transmitted before receipt is received at the proxy server that the connection was successful to the remote service. For example, when there is was a previous request from the proxy server (or local server) to the remote service that was successful; when there is a currently active request to the proxy server and remote server; when there is a currently active request to the same service from the same proxy server, but from the same (or different) client; based on a predefined amount of time since the last successful access to the remote service; or based on a predefined amount of time since a last successful access to the remote service.

At block 230, proxy server 105 can receive data to transmit from the local service 115a-e of the local client 130 to the remote service 120a-e of the remote clients 135 (or remote server 110). For example, NFS client 115d can transmit data to the proxy server 105, the data including a file system directory the service is requesting to access.

At block 240, the proxy server 105 can assign an unused sub-channel over the long-standing tunnel to the connection requested from the local service of the local client 130 to remote server 110 of remote clients 135 running the remote service. For example, the long-standing tunnel between the proxy server 105 and remote sever 110 can be divided into a plurality of assignable sub-channels. The connection can include a protocol that enables the proxy server to assign and manage the sub-channels.

At block 250, the data from the local service 115a-e of the local client 130 is transmitted through the sub-channel created by proxy server 105 to the remote service 120a-e of remote clients 135 (through remote server 110). For example, the data including a request for the file system directory can be transmitted to the remote service of the remote client (or remote server) to enable the local service access to the directory.

Figure 3A:
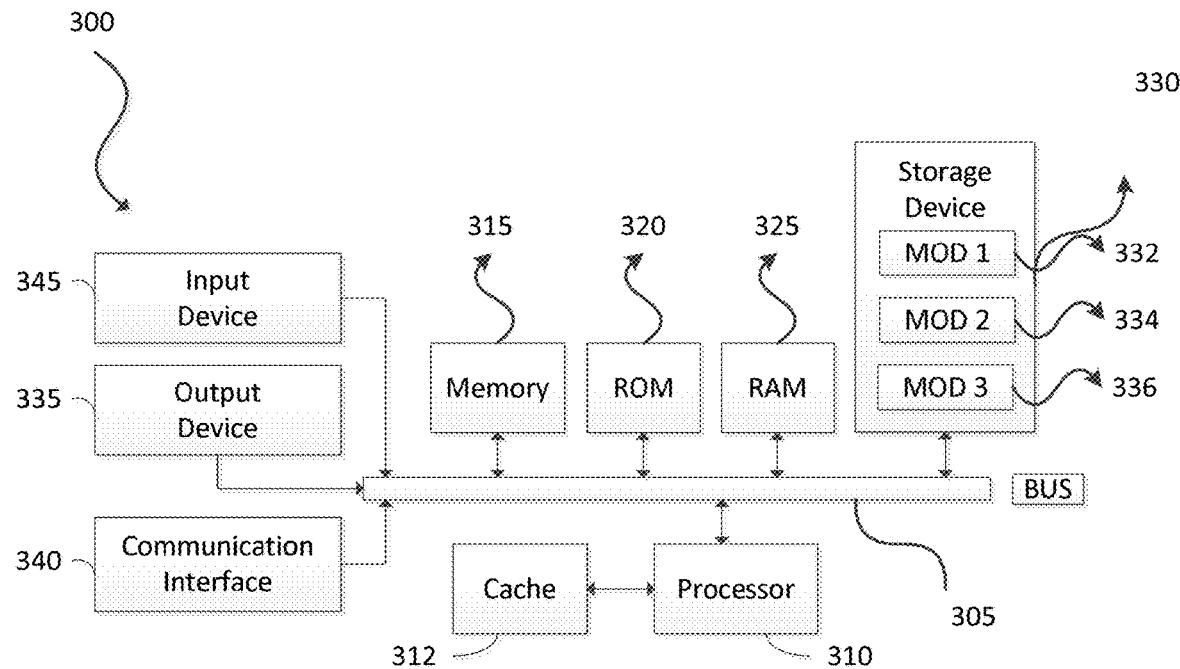
FIG. 3A shows an exemplary possible system embodiment for implementing various embodiments of the present technology.
Figure 3B:
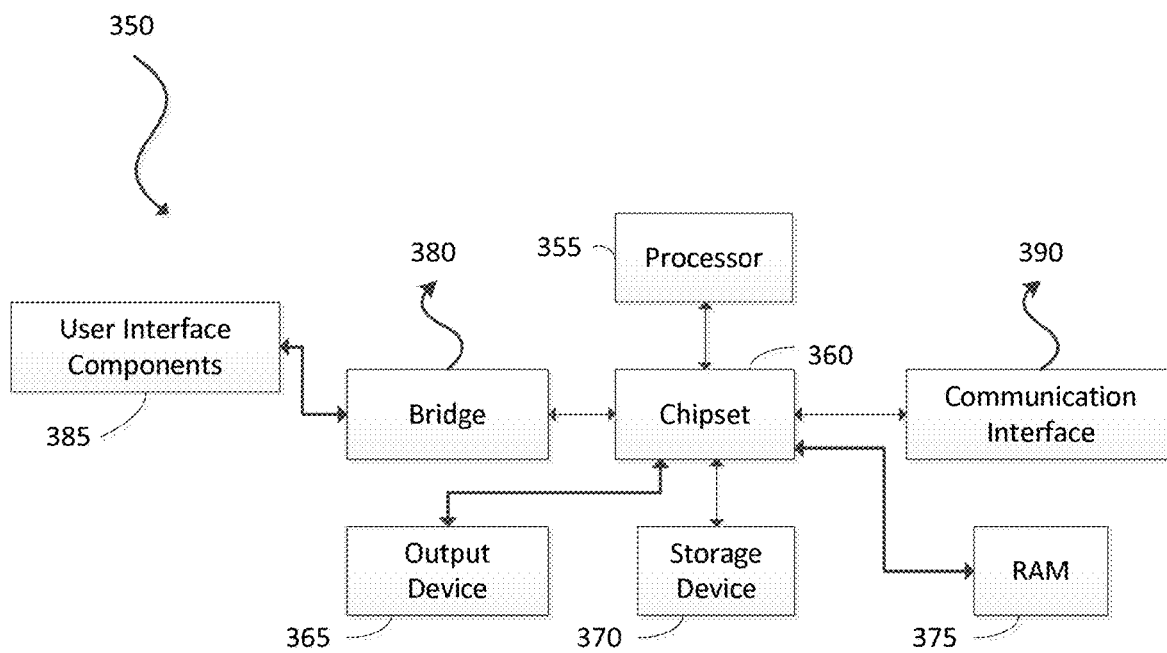
FIG. 3B shows an exemplary possible system embodiment for implementing various embodiments of the present technology.

FIG. 3A and FIG. 3B show exemplary possible system embodiments. The more appropriate embodiment will be apparent to those of ordinary skill in the art when practicing the present technology. Persons of ordinary skill in the art will also readily appreciate that other system embodiments are possible.

FIG. 3A illustrates a conventional system bus computing system architecture 300 wherein the components of the system are in electrical communication with each other using a bus 30. Exemplary system 300 includes a processing unit (e.g., CPU, processor(s), etc.) 310 and a system bus 305 that couples various system components including the system memory 315, such as read only memory (ROM) 320 and random access memory (RAM) 325, to the processor 310. The system 300 can include a cache of high-speed memory connected directly with, in close proximity to, or integrated as part of the processor 310. The system 300 can copy data from the memory 315 and/or the storage device 330 to the cache 312 for quick access by the processor 310. In this way, the cache can provide a performance boost that avoids processor 310 delays while waiting for data. These and other modules can control or be configured to control the processor 310 to perform various actions. Other system memory 315 may be available for use as well. The memory 315 can include multiple different types of memory with different performance characteristics. The processor 310 can include any general purpose processor and a hardware module or software module, such as module 1 332, module 2 334, and module 3 336 stored in storage device 330, configured to control the processor 310 as well as a special-purpose processor where software instructions are incorporated into the actual processor design. The processor 310 may essentially be a completely self-contained computing system, containing multiple cores or processors, a bus, memory controller, cache, etc. A multi-core processor may be symmetric or asymmetric.

To enable user interaction with the computing device 300, an input device 345 can represent any number of input mechanisms, such as a microphone for speech, a touch-sensitive screen for gesture or graphical input, keyboard, mouse, motion input, speech and so forth. An output device 335 can also be one or more of a number of output mechanisms known to those of skill in the art. In some instances, multimodal systems can enable a user to provide multiple types of input to communicate with the computing device 300. The communications interface 340 can generally govern and manage the user input and system output. There is no restriction on operating on any particular hardware arrangement and therefore the basic features here may easily be substituted for improved hardware or firmware arrangements as they are developed.

Storage device 330 is a non-volatile memory and can be a hard disk or other types of computer readable media which can store data that are accessible by a computer, such as magnetic cassettes, flash memory cards, solid state memory devices, digital versatile disks, cartridges, RAM 325, ROM 320, and hybrids thereof.

The storage device 330 can include software modules 332, 334, 336 for controlling the processor 310. Other hardware or software modules are contemplated. The storage device 330 can be connected to the system bus 305. In one aspect, a hardware module that performs a particular function can include the software component stored in a computer-readable medium in connection with the necessary hardware components, such as the processor 310, bus 305, display 335, and so forth, to carry out the function.

FIG. 3B illustrates a computer system 350 having a chipset architecture that can be used in executing the described method and generating and displaying a graphical user interface (GUI). Computer system 350 is an example of computer hardware, software, and firmware that can be used to implement the disclosed technology. System 350 can include a processor 355, representative of any number of physically and/or logically distinct resources capable of executing software, firmware, and hardware configured to perform identified computations. Processor 355 can communicate with a chipset 360 that can control input to and output from processor 355. In this example, chipset 360 outputs information to output 365, such as a display, and can read and write information to storage device 370, which can include magnetic media, and solid state media, for example. Chipset 360 can also read data from and write data to RAM 375. A bridge 380 for interfacing with a variety of user interface components 385 can be provided for interfacing with chipset 360. Such user interface components 385 can include a keyboard, a microphone, touch detection and processing circuitry, a pointing device, such as a mouse, and so on. In general, inputs to system 350 can come from any of a variety of sources, machine generated and/or human generated.

Chipset 360 can also interface with one or more communication interfaces 390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 355 analyzing data stored in storage 370 or 375. Further, the machine can receive inputs from a user via user interface components 385 and execute appropriate functions, such as browsing functions by interpreting these inputs using processor 355.

It can be appreciated that exemplary systems 300 and 350 can have more than one processor 310 or be part of a group or cluster of computing devices networked together to provide greater processing capability.

For clarity of explanation, in some instances the present technology may be presented as including individual functional blocks including functional blocks comprising devices, device components, blocks or routines in a method embodied in software, or combinations of hardware and software.

Any of the blocks, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method blocks, it is to be understood that the subject matter defined in the appended claims is not necessarily limited to these described features or acts. For example, such functionality can be distributed differently or performed in components other than those identified herein. Rather, the described features and blocks are disclosed as examples of components of systems and methods within the scope of the appended claims.

I claim:

1. A method for avoiding proxy connection latency, the method comprising:
receiving, at a proxy server from a local client running a local service, a client connection request to connect with a remote service of a remote server;
transmitting, to the remote server, the client connection request;
transmitting, from the proxy server to the local client, an acknowledgment that the client connection request transmitted to the remote server was successful, wherein the acknowledgement is transmitted before the proxy server has received an indication from the remote server that the client connection request was successful, based on a determination that a pre-established tunnel exists between the proxy server and the remote server, such that an initial connection between the local service of the local client and the remote service of the remote server is established without performing a round trip between the local client and the remote server;
receiving, from the local client in response to the proxy server acknowledgement that the client connection request was successfully transmitted, local data to be transmitted to the remote server;
assigning, by the proxy server, an unused sub-channel over the pre-established tunnel between the proxy server and remote server, wherein the unused sub-channel is assigned to a connection requested by the local service of the client connection request; and
transmitting to the remote server an indication of the remote service to connect to the local service and transmitting the local data to the remote service of the remote server.

2. The method of claim 1, wherein the acknowledgement is transmitted before the proxy server has received the acknowledgment when there is was a previous request from the proxy server to the remote service that was successful.

3. The method of claim 1, wherein the acknowledgement is transmitted before the proxy server has received the acknowledgment when there is a currently active request to the proxy server and remote server.

4. The method of claim 1, wherein the acknowledgement is transmitted before the proxy server has received the acknowledgment based on a predefined amount of time since a last successful access to the remote service.

5. The method of claim 1, further comprising:
receiving, from the remote server, services available for connection.

6. The method of claim 5, wherein the services available enable automated discovery of a network topology and dynamically remap local services to other remote services.

7. At least one non-transitory medium having stored therein instructions, which when executed by a processor, cause the processor to:
receive from a local client running a local service a client connection request to connect with a remote service of a remote server;
transmit, to the remote server, the client connection request;
transmit, to the local client, an acknowledgment that the client connection request transmitted to the remote server was successful, wherein the acknowledgement is transmitted before the proxy server has received an indication from the remote server that the client connection request was successful, based on a determination that a pre-established tunnel exists between the proxy server and the remote server, such that an initial connection between the local service of the local client and the remote service of the remote server is established without performing a round trip between the local client and the remote server;

receive, from the local client, local data to be transmitted to the remote server;

assign an unused sub-channel over the pre-established tunnel between the proxy server and remote server to the client connection request; and transmit to the remote server, in a single data packet, an indication of the remote service to connect to the local service and the local data to the remote service of the remote server.

8. The at least one non-transitory medium of claim 7, wherein the acknowledgement is transmitted before the proxy server has received the acknowledgment when there is was a previous request from the proxy server to the remote service that was successful.

9. The at least one non-transitory medium of claim 7, wherein the acknowledgement is transmitted before the proxy server has received the acknowledgment when there is a currently active request to the proxy server and remote server.

10. The at least one non-transitory medium of claim 7, wherein the acknowledgement is transmitted before the proxy server has received the acknowledgment based on a predefined amount of time since a last successful access to the remote service.

11. The at least one non-transitory medium of claim 7, having further instructions which when executed by the processor cause the processor to:

receive, from remote server, services available for connection.

12. The at least one non-transitory medium of claim 11, wherein the services available enable automated discovery of a network topology and dynamically remap local services to other remote services.

13. A proxy server comprising:

at least one processor; and at least one memory storing instructions, which when executed by the processor, cause the processor to:

receive from a local client running a local service a client connection request to connect with a remote service of a remote server;

transmit, to the remote server, the client connection request;

transmit, to the local client, an acknowledgment that the client connection request transmitted to the remote server was successful, wherein the acknowledgement is transmitted before the proxy server has received an indication from the remote server that the client connection request was successful, based on a determination that a pre-established tunnel exists between the proxy server and the remote server, such that an initial connection is established without performing a round trip to the remote server;

receive, from the local client, local data to transmit to the remote server;

assign an unused sub-channel over the pre-established tunnel between the proxy server and remote server to the client connection request; and transmit to the remote server, in a single data packet, an indication of the remote service to connect to the local service and the local data to the remote service of the remote server.

14. The proxy server of claim 13, wherein the acknowledgement is transmitted before the proxy server has received the acknowledgment when there is was a previous request from the proxy server to the remote service that was successful.

15. The proxy server of claim 13, wherein the acknowledgement is transmitted before the proxy server has received the acknowledgment when there is a currently active request to the proxy server and remote server.

16. The proxy server of claim 13, wherein the acknowledgement is transmitted before the proxy server has received the acknowledgment based on a predefined amount of time since a last successful access to the remote service.

17. The proxy server of claim 13, having further instructions which when executed by the processor cause the processor to:

receive, from remote server, services available for connection.

* * * * *